US012539585B2

(12) United States Patent
Lehr et al.

(10) Patent No.: US 12,539,585 B2
(45) Date of Patent: Feb. 3, 2026

(54) TOOL HEAD FOR A TOOL

(71) Applicant: GUSTAV KLAUKE GMBH, Remscheid (DE)

(72) Inventors: Andreas Lehr, Neuss (DE); Amir Qasem Mohamed Dennis Schönenberg-Masoud, Remscheid (DE); Maximilian Christians, Wuppertal (DE); Egbert Frenken, Heinsberg (DE)

(73) Assignee: GUSTAV KLAUKE GMBH, Remscheid (DE)

( * ) Notice: Subject to any disclaimer, the term of this patent is extended or adjusted under 35 U.S.C. 154(b) by 71 days.

(21) Appl. No.: 18/551,377

(22) PCT Filed: Mar. 25, 2022

(86) PCT No.: PCT/EP2022/057861
§ 371 (c)(1),
(2) Date: Sep. 19, 2023

(87) PCT Pub. No.: WO2022/200543
PCT Pub. Date: Sep. 29, 2022

(65) Prior Publication Data

US 2024/0165777 A1 May 23, 2024

(30) Foreign Application Priority Data

Mar. 25, 2021 (DE) ..................... 20 2021 101 592.6
Mar. 21, 2022 (DE) ..................... 10 2022 106 499.9

(51) Int. Cl.
*B25B 27/02* (2006.01)
*B25F 5/00* (2006.01)

(52) U.S. Cl.
CPC ............ *B25B 27/026* (2013.01); *B25F 5/005* (2013.01)

(58) Field of Classification Search
CPC ..... B25B 27/026; B25B 27/146; B25B 27/10; B25F 5/005
See application file for complete search history.

(56) References Cited

U.S. PATENT DOCUMENTS 3,554,000 A * 1/1971 Schwab ............. H01R 43/0427 100/231
6,227,030 B1 5/2001 Lefavour et al.
(Continued)

FOREIGN PATENT DOCUMENTS

EP 1084798 B1 6/2009

OTHER PUBLICATIONS

International Search Report and Written Opinion for PCT/EP2022/057861 mailed dated Jun. 21, 2022, 12 pages.

*Primary Examiner* — Thomas M Wittenschlaeger
*Assistant Examiner* — Katie L Gerth
(74) *Attorney, Agent, or Firm* — Klintworth & Rozenblat LLP

(57) ABSTRACT

A tool head is provided for a hydraulically actuatable tool. The tool head has an essentially C-shaped head body with two C-legs, and a connecting web connecting the C-legs. Each C-leg has a tool carrier for receiving a tool part. The second tool carrier is mounted to be displaceable to the first tool carrier from a first starting position remote from the first tool carrier while traversing a device jaw of the C-shaped head body into a final working position adjacent to the first tool carrier. The connecting web has several through openings lying one behind the other along the longitudinal axis and are separated by a material bracing. The through openings follow an arched shape of the connecting web, and not a line parallel to the longitudinal axis of the tool head.

22 Claims, 8 Drawing Sheets

(56) References Cited

U.S. PATENT DOCUMENTS

| | | | | |
|---|---|---|---|---|
| 6,619,101 | B1 * | 9/2003 | Faucher | B25B 27/10 72/416 |
| 6,666,064 | B2 * | 12/2003 | LeFavour | B25B 27/10 417/415 |
| 6,718,870 | B1 * | 4/2004 | Frenken | B25B 27/146 100/231 |
| 9,774,159 | B2 | 9/2017 | Hamm et al. | |
| D830,147 | S * | 10/2018 | Lefavour | D8/68 |
| 10,109,971 | B2 * | 10/2018 | Lefavour | B23P 11/005 |
| D1,037,815 | S * | 8/2024 | Christians | D8/70 |
| D1,042,068 | S * | 9/2024 | SchöNenberg-Masoud | D8/68 |
| 12,142,887 | B2 * | 11/2024 | Zhou | H01R 43/058 |
| 2003/0188566 | A1 * | 10/2003 | Lefavour | B25B 27/10 72/453.16 |
| 2003/0196472 | A1 * | 10/2003 | LeFavour | B25B 27/10 72/455 |
| 2013/0025101 | A1 * | 1/2013 | Pfeiffer | B25B 27/10 29/237 |
| 2013/0240228 | A1 * | 9/2013 | Lefavour | B21D 39/048 173/20 |
| 2016/0211635 | A1 * | 7/2016 | Hamm | H01R 43/0427 |
| 2019/0160643 | A1 * | 5/2019 | Lefavour | B25F 5/005 |
| 2019/0201966 | A1 * | 7/2019 | Khansa | H01R 43/058 |
| 2019/0291165 | A1 | 9/2019 | Chen et al. | |
| 2020/0147772 | A1 | 5/2020 | Frenken | |
| 2021/0008611 | A1 * | 1/2021 | Krause | B25B 27/10 |
| 2021/0379746 | A1 * | 12/2021 | Frenken | H01R 43/0428 |

* cited by examiner

TOOL HEAD FOR A TOOL

AREA OF TECHNOLOGY

The invention relates to a tool head for a tool, in particular for a hydraulically actuatable tool, wherein the tool head, as viewed from the side, has an essentially C-shaped head body with two C-legs lying opposite each other along a longitudinal axis of the tool head, and a connecting web that connects the C-legs, wherein a first C-leg has a first tool carrier for receiving a first tool part, and wherein a second C-leg has a second tool carrier for receiving a second tool part, wherein the second tool carrier is mounted in the tool head so as to be displaceable to the first tool carrier, so that the second tool carrier can be displaced from a first starting position remote from the first tool carrier while traversing a device jaw of the C-shaped head body into a final working position adjacent to the first tool carrier, and wherein the connecting web, as viewed from the side transverse to the longitudinal axis of the tool head, has several through openings lying one behind the other along the longitudinal axis, wherein adjacent through openings are separated by a material bracing, and the head body of the tool head is manufactured in a metal casting process.

The invention further relates to a method for manufacturing this type of tool head.

PRIOR ART

Tool heads of the aforementioned kind are known in prior art in various configurations. In conjunction with corresponding tool parts, the tool heads are used for pressing, cutting, or punching workpieces, for example. For example, such a tool with a tool head is described in EP 1 084 798 B1, also published as U.S. Pat. No. 6,718,870 B1.

A tool head of the generic type is further disclosed in U.S. Pat. No. 6,619,101 B1.

Tool heads of the aforementioned kind, but wherein only tool heads without the addressed through openings have become known, are usually manufactured in a forging process.

SUMMARY OF THE INVENTION

Proceeding from the aforementioned prior art, the object of the present invention is to further develop a tool head of the aforementioned kind in relation to the lowest possible weight on the one hand, and in relation to operational safety on the other. In particular, the aim is to prevent parts of the head body from detaching given a breakage of the head body due to the tool head having reached the end of its service life, which otherwise could cause serious injuries in users of the tool.

In order to achieve the aforementioned object, it is proposed that the head body of the tool head be manufactured in a metal casting process. In particular, the head body can be manufactured out of steel or titanium. The tool head manufactured in the metal casting process has a consistency like conventionally forged steel, but with manufacturing being more cost effective. In particular when manufacturing within the framework of investment casting with the use of quenched and tempered steel, a preferably shrink hole-free or at least shrink hole-reduced design of the tool head can be achieved. Alternatively, the tool head can also have an alloy based very predominantly on titanium, so that further reductions in weight can be achieved.

The connecting web of the tool head, as viewed from the side transverse to the longitudinal axis of the tool head, has several through openings lying one behind the other along the longitudinal axis. The through openings serve to intercept cracks of the connecting web, e.g., caused by ageing, which could otherwise completely penetrate the connecting web up to an edge area facing away from the device jaw of the head body, and thus could cause parts of the tool head to be flung away or at least fall off. The aforementioned through openings can result in a significant weight reduction of the tool head on the one hand, and on the other hand advantageously enhance the formation of the tool head out of a cast metal, since any instabilities caused by shrink holes that arose in the casting material can then also be compensated. The through openings introduced into the connecting web thus yield an improved topology, which makes it possible to reduce the tool head to a base structure that ensures a required stability at the loads or forces typically to be sustained. In exemplary embodiments, such tool heads are suitable in practice for forces exceeding 100 KN, for example 120 kN or more. Depending on the reduction in material volume by the through openings, which constitute material recesses inside of the connecting web, large reductions in weight can be achieved, wherein the structure described above of the connecting web having through openings can additionally provide for an advantageous breakage behavior. The savings in material to be achieved by the through openings is here limited by a required strength and rigidity of the tool head.

In conjunction with forming the head body of the tool head within the framework of a metal casting process, an overall geometry can be achieved that cannot be achieved through the use of classic manufacturing processes, such as forging. The through openings are here introduced into the tool head, specifically into its connecting web, in such a way as to retain the essential support structures of the original geometry, without through openings. The reduction in weight by the through openings can in practice measure 25 percent or more than the original tool head, for example.

In particular, it is recommended for the safety function achieved by the through openings that at least one of the through openings be formed directly parallel next to the device jaw of the head body, specifically in a section of the connecting web arranged parallel to the device jaw in relation to the longitudinal axis of the tool head. Due to the design, a crack emanating from the device jaw of the tool head thus ends in a through opening, and not at an outer edge area of the connecting web. A part of the connecting web more remote from the device jaw can thus remain intact if a crack arises because the tool head has reached the end of its service life. Parts of the tool head are effectively prevented from coming off and being flung away or falling.

In addition, it can be provided that an edge area of the connecting web spaced apart from the device jaw by the through opening have an edge height transverse to the longitudinal axis that measures 20 percent to 40 percent of an opening height of a through opening. As a consequence, the material thickness of the edge area remaining next to the through openings on the outer edge of the connecting web is significantly smaller than the opening height of the adjacent through opening. However, the ratio between the height of the material recess of the through opening and the edge area of the connecting web remaining adjacent thereto is at any rate dimensioned in such a way that a required stability relative to the tool head remains ensured.

It is proposed that the connecting web have three to five, in particular four, through openings, which, as viewed from the side transverse to the longitudinal axis of the tool head, are arranged arched one next to the other from the first C-leg up to the second C-leg. As a consequence, the through openings can be arranged side by side to essentially follow the C-shape of the tool head. Proceeding from a geometric center of the device jaw in relation to a side view of the C-shape of the head body, a star-shaped arrangement of the through openings around the geometric center can thereby arise, wherein the through openings proceed from the device jaw and extend radially in the direction of the edge area of the connecting web facing away from the device jaw, but do not penetrate through a residual material of the edge area. The arched arrangement of through openings around a circumferential section of the device jaw makes it possible to successfully intercept cracks that emanate from any points of the device jaw, so that the latter cannot completely penetrate through the connecting web, but rather end in a through opening adjacent to the device jaw.

Two or more of the material bracings can be divergently designed in relation to their respective longitudinal center axis, with a large distance between each other in areas of the material bracings remote from the device jaw.

It is further proposed that one, several or all through openings expand proceeding from the device jaw of the head body up to an edge area of the connecting web facing away from the device jaw of the head body. The through opening thus expands in relation to a radial direction proceeding from a center of the device jaw, so that the material recess is formed toward the outer edge area of the connecting web to a relatively greater extent, so that the device jaw of the head body is surrounded by a relatively large amount of material, and the stability of the head body is thus not diminished. At the same time, the material recesses of the through openings reduce the weight of the tool head. In particular, the expansion is achieved by divergently aligning two, three or all material bracings relative to each other.

With respect to the design of the material bracings, it is further proposed that the material bracing have a bracing width as viewed transverse to the opening plane of the through opening that corresponds to approx. 10 percent to 50 percent of an opening width of the through opening. As a consequence, the material bracings formed between the through openings are significantly thinner than the width of the through opening. As a result, the probability that a crack emanating from the device jaw of the head body will end in a through opening is significantly higher than the probability that the crack will get to a material bracing, and there be able to penetrate through the entire connecting web in a radial direction, causing parts of the tool head to detach.

In this conjunction, it is proposed in particular that one, several or all material bracings have an essentially constant bracing width proceeding from the device jaw of the head body up to an edge area of the connecting web facing away from the device jaw of the head body. As a consequence, the material bracings are preferably no wider adjacent to the device jaw than at the outwardly facing edge area of the connecting web, so that the transitional area described above between the device jaw and the material bracing is as narrow as possible, and the probability of damage caused by a crack is especially low. A special embodiment can also provide that the material bracings expand proceeding from the device jaw, so that their stability in the outer edge area of the connecting web is increased.

It can alternatively be provided that the material bracing be essentially waist-shaped as viewed transverse to the opening plane of the through opening, wherein the material bracing initially tapers proceeding from the device jaw of the head body up to an edge area of the connecting web facing away from the device jaw of the head body, and then expands again. In this embodiment, the material bracings can be tapered in a center area in relation to their longitudinal extension, in order to further reduce the weight of the tool head. In addition, the broader design in relation thereto at the transitional areas to the device jaw along with the edge area of the connecting web remote from the device jaw make it possible to maintain a stable basic shape of the tool head.

In addition, it can be provided that a through opening have an opening width relative to a direction parallel to the longitudinal axis of the tool head corresponding to approx. 50 percent to 100 percent of a width of the device jaw of the head body. According to this embodiment, in particular one of several through openings can have an especially large opening width, so that the through opening runs along a large portion of the longitudinal extension of the device jaw, and cracks emanating from the device jaw thus in any event end in the through opening, and do not run to a material bracing. As a consequence, one of several through openings can be significantly larger, i.e., wider, in design relative to the remaining through openings, for example have an opening width that is two times larger. Depending on the structural design of the tool head and special load of the material in specific partial areas of the device jaw, a more or less wide through opening can thus be provided.

Finally, a method is proposed in addition to the tool head described above, wherein the method involves manufacturing the head body of the tool head via metal casting. In particular, it is proposed that the head body be manufactured via the investment casting of steel or titanium. Investment casting can involve casting in a lost wax process. As an alternative to wax, the model that is initially fabricated for this purpose so as to then be surrounded with a molding compound can also consist of some other meltable material, for example such as plastic.

BRIEF DESCRIPTION OF THE DRAWINGS

While the invention is explained below based upon the attached drawing, the latter only depict exemplary embodiments. Therefore, a part of the depicted tool head that is described only in relation to one of the exemplary embodiments, but could likewise find application in an additional exemplary embodiment according to the invention, is also described as at least being possible for the additional exemplary embodiment as well. Shown in detail on the drawings.

DESCRIPTION OF THE EMBODIMENTS

The figures described below show two different possible embodiments of a tool 2, wherein FIGS. 1 to 4 relate to a first embodiment, and wherein FIGS. 5 to 8 relate to a second possible embodiment. Additional alternative embodiments are also possible, so that FIGS. 1 to 8 must here not be construed as limiting, but rather serve to explain the possible features.

Figure 1:
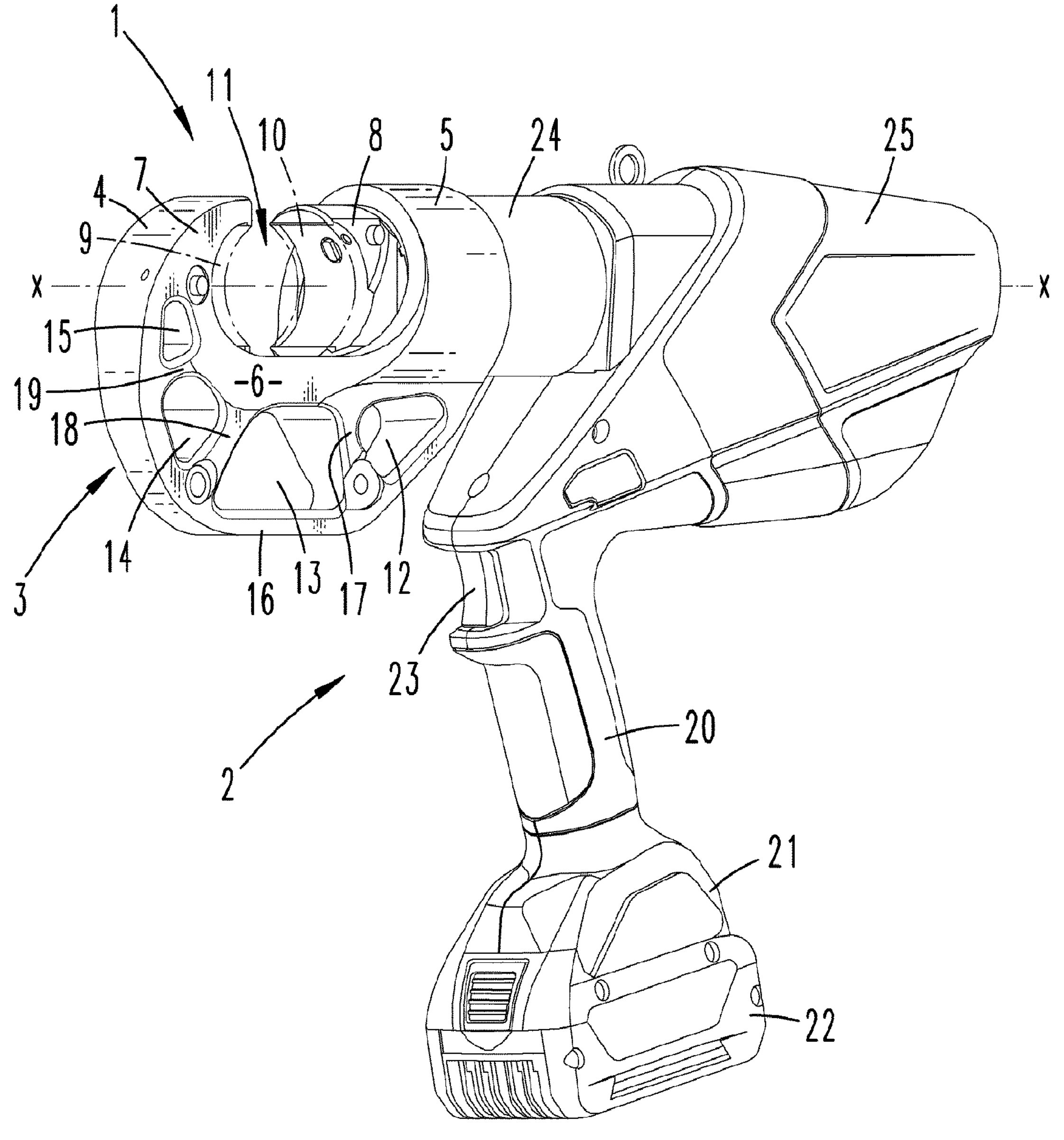
FIG. 1 is a tool with a tool head according to the invention in a first embodiment.
Figure 2:
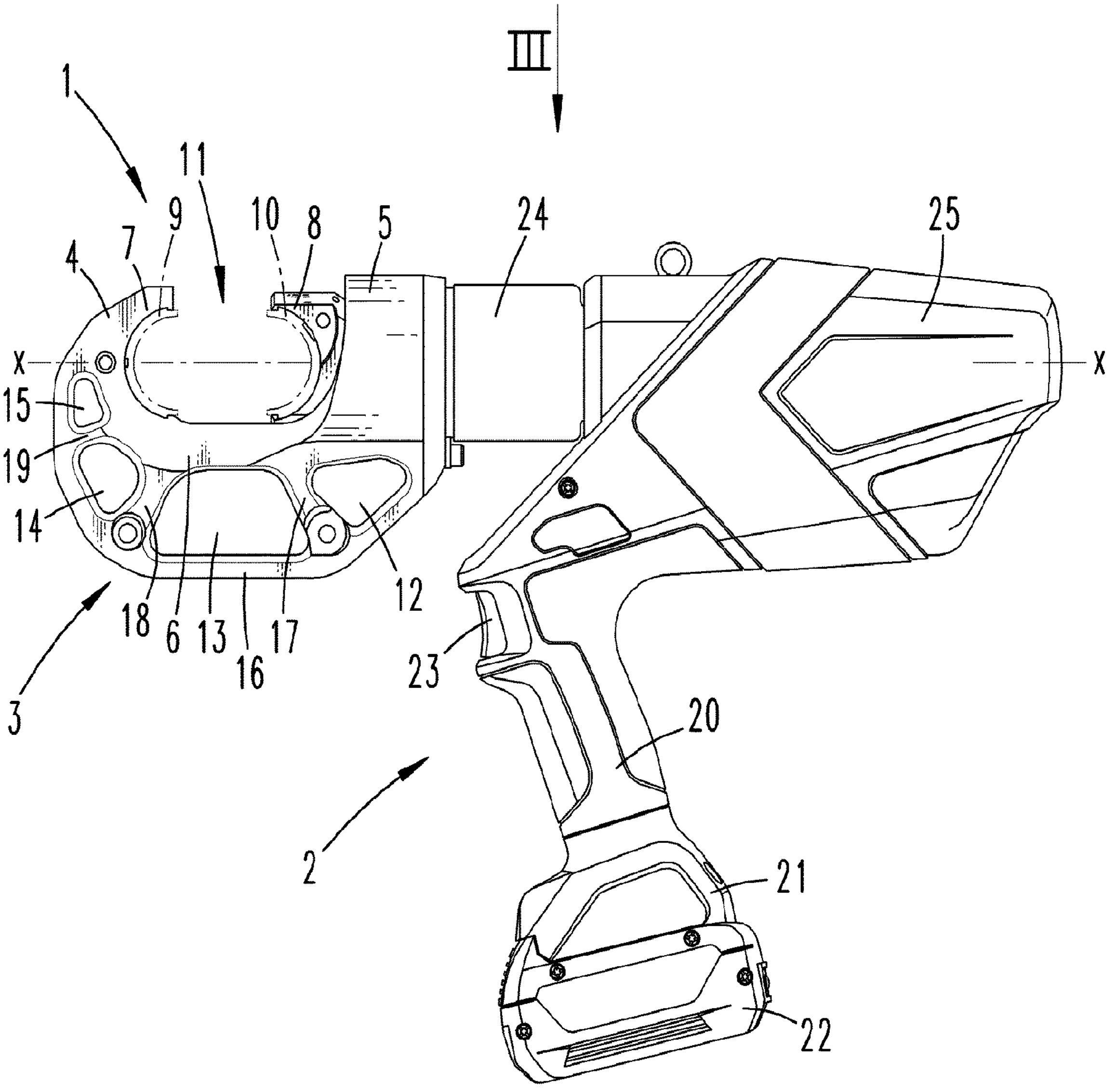
FIG. 2 is a side view of the tool.
Figure 3:
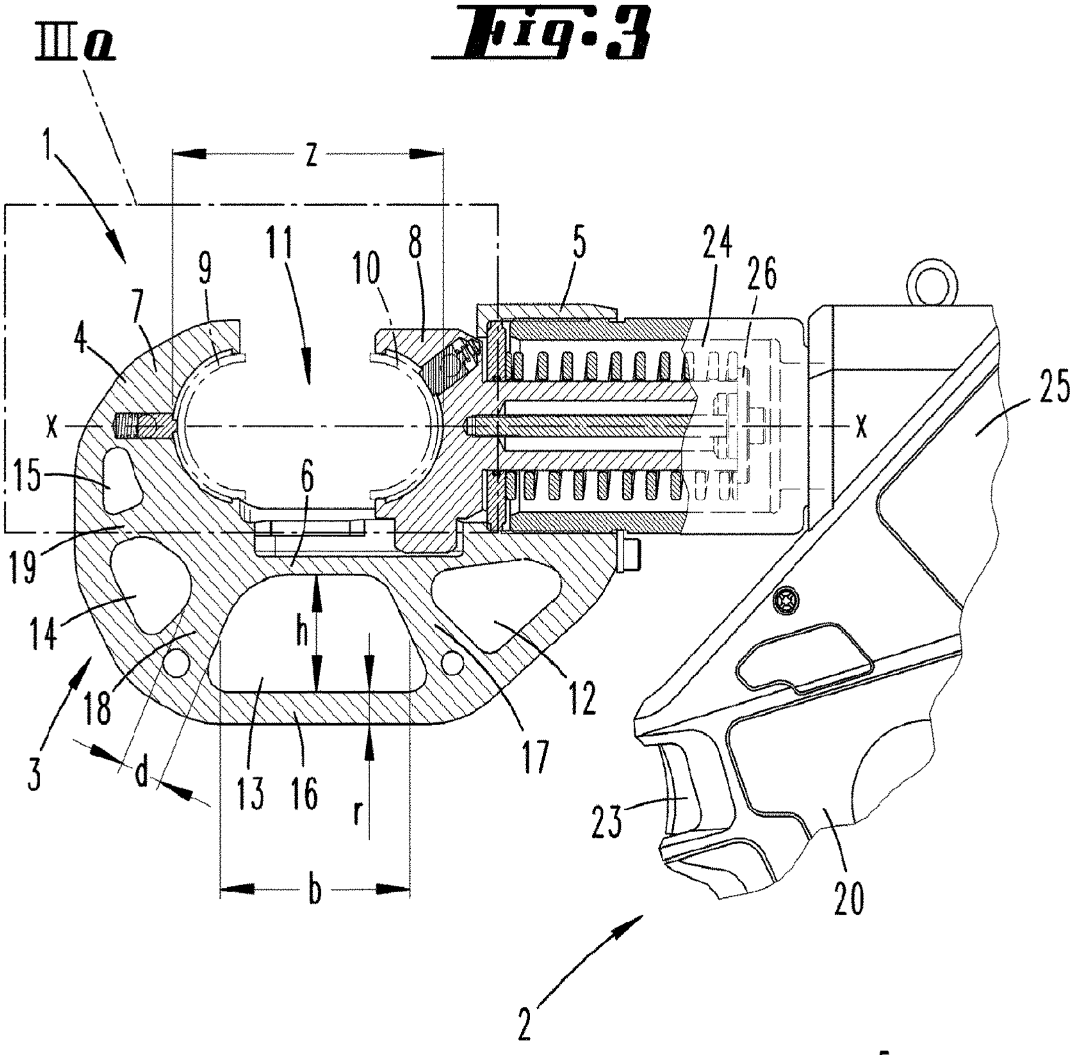
FIG. 3 is a longitudinal section of the tool head.
Figure 3A:
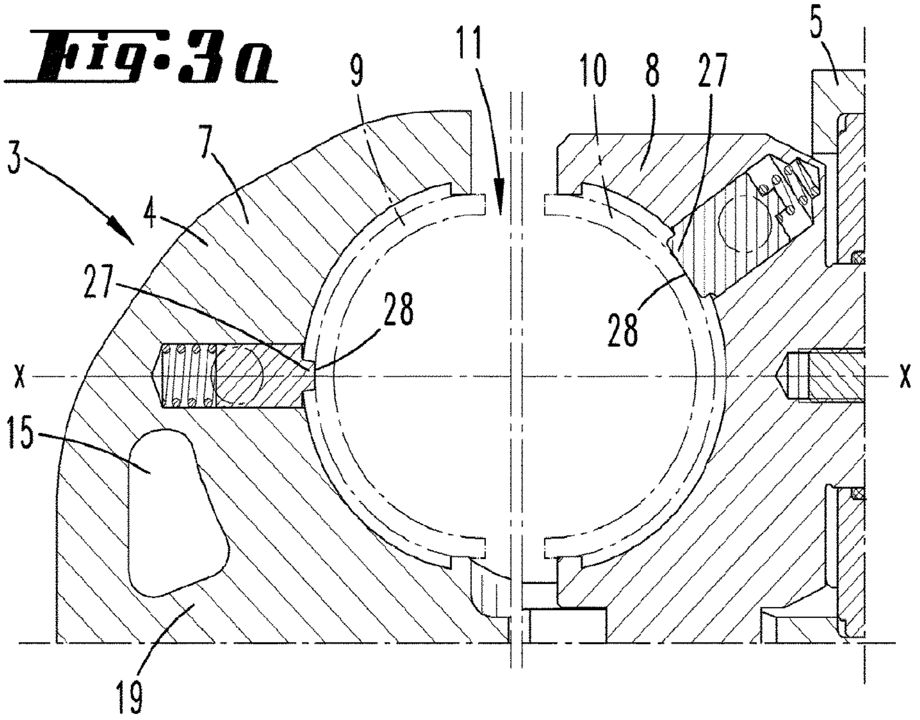
Figure 4:
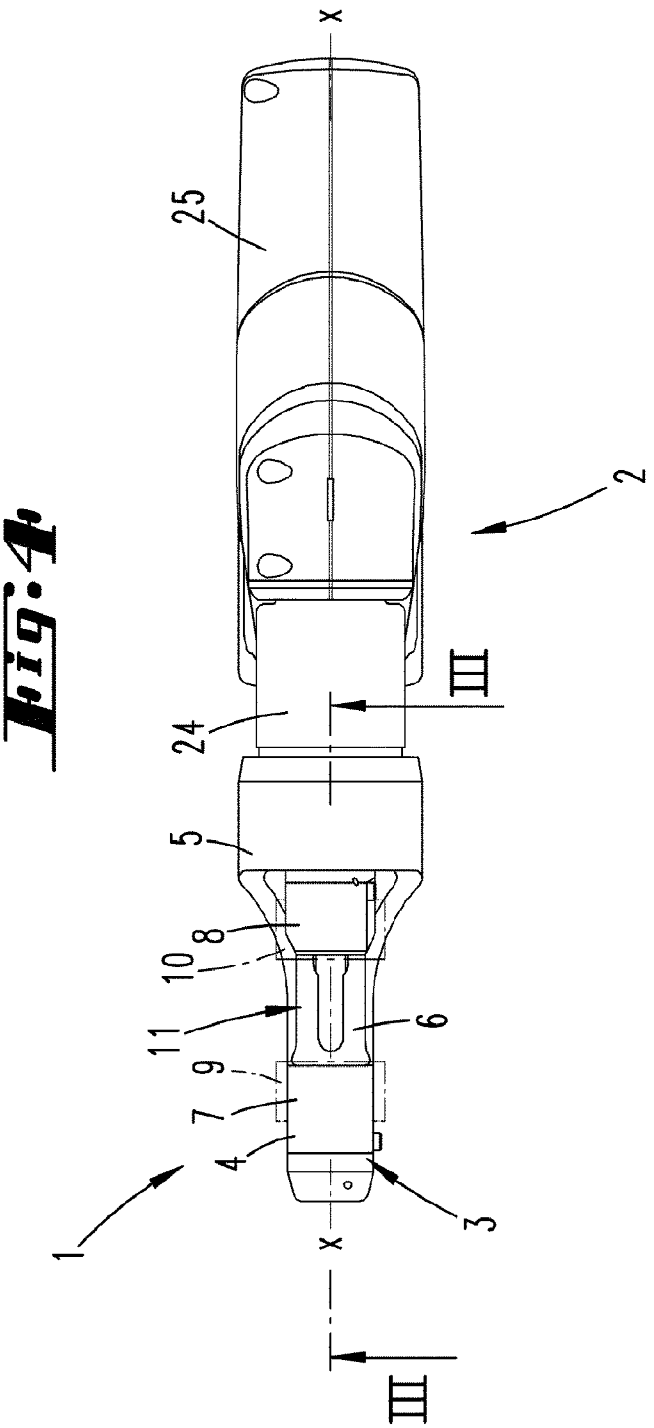
FIG. 4 is a top view of the tool according to FIG. 1.
Figure 5:
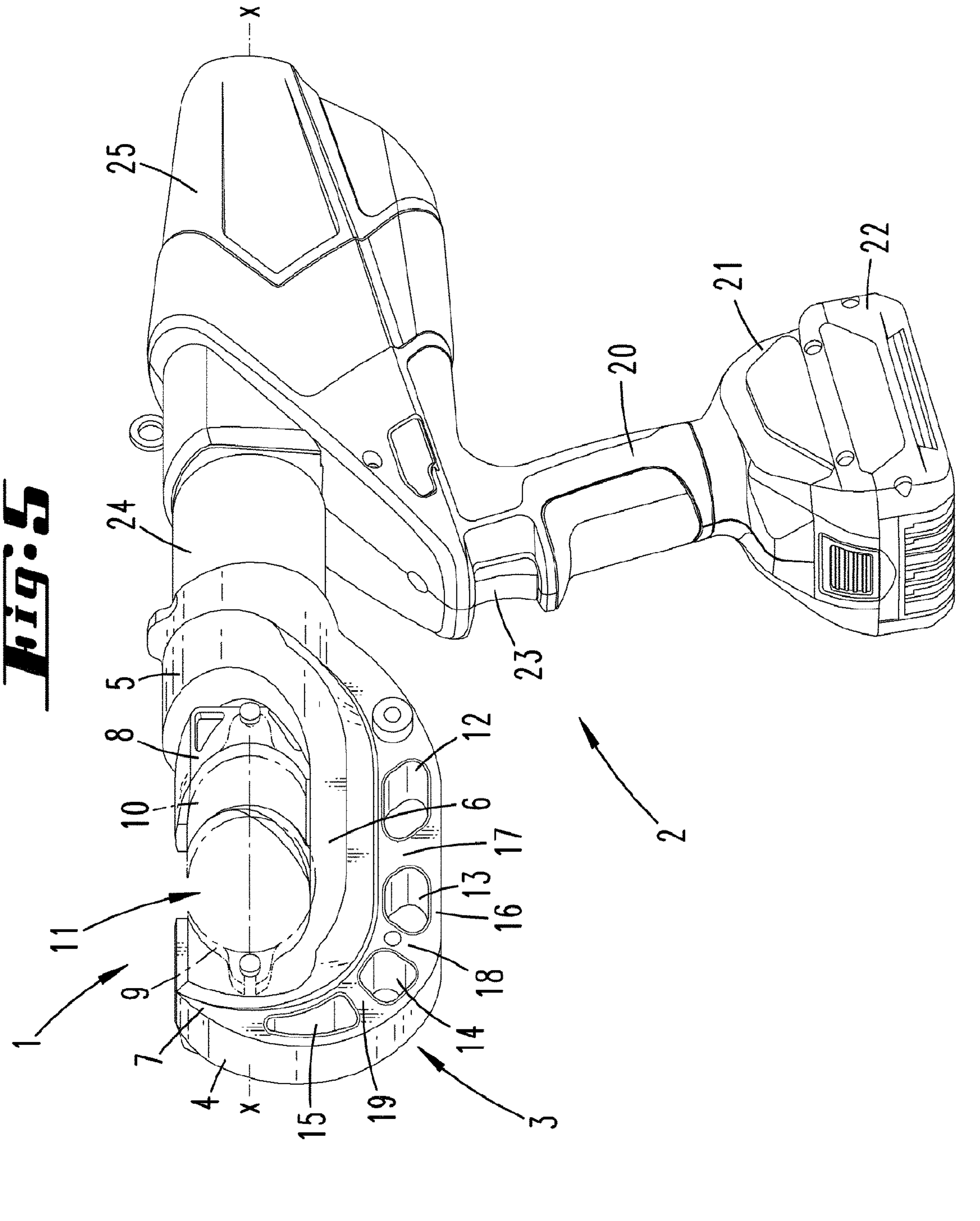
FIG. 5 is a tool with a tool head according to the invention in a second embodiment.
Figure 6A:
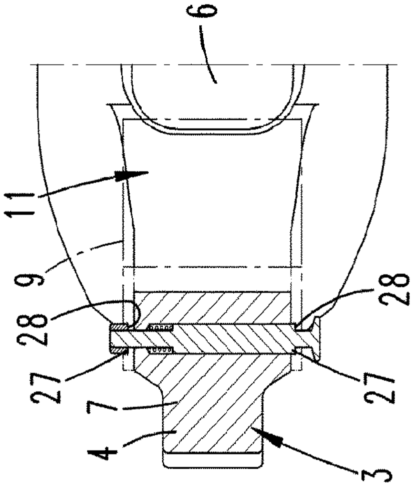
FIG. 6 is a side view of the tool.
Figure 6:
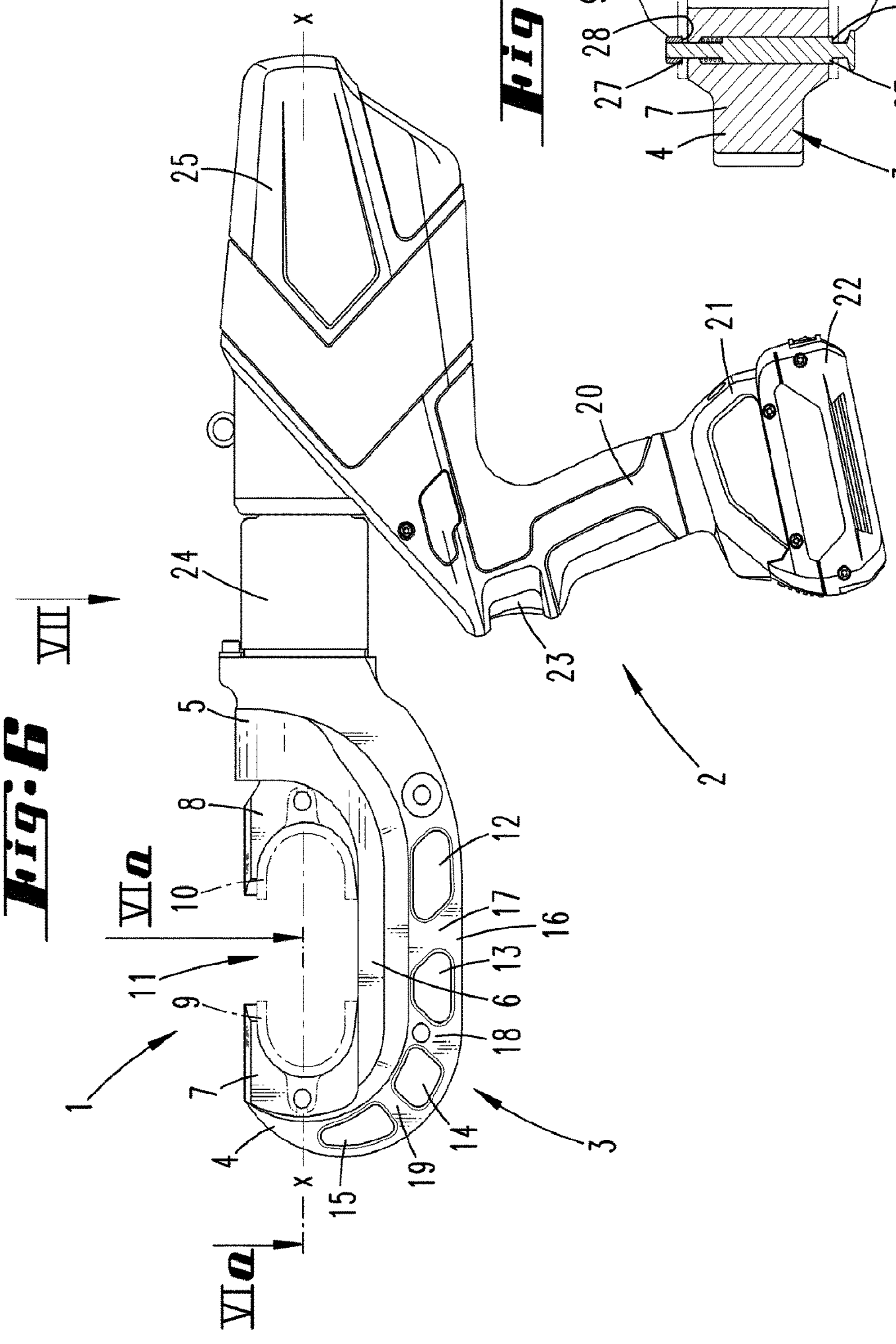
Figure 7:
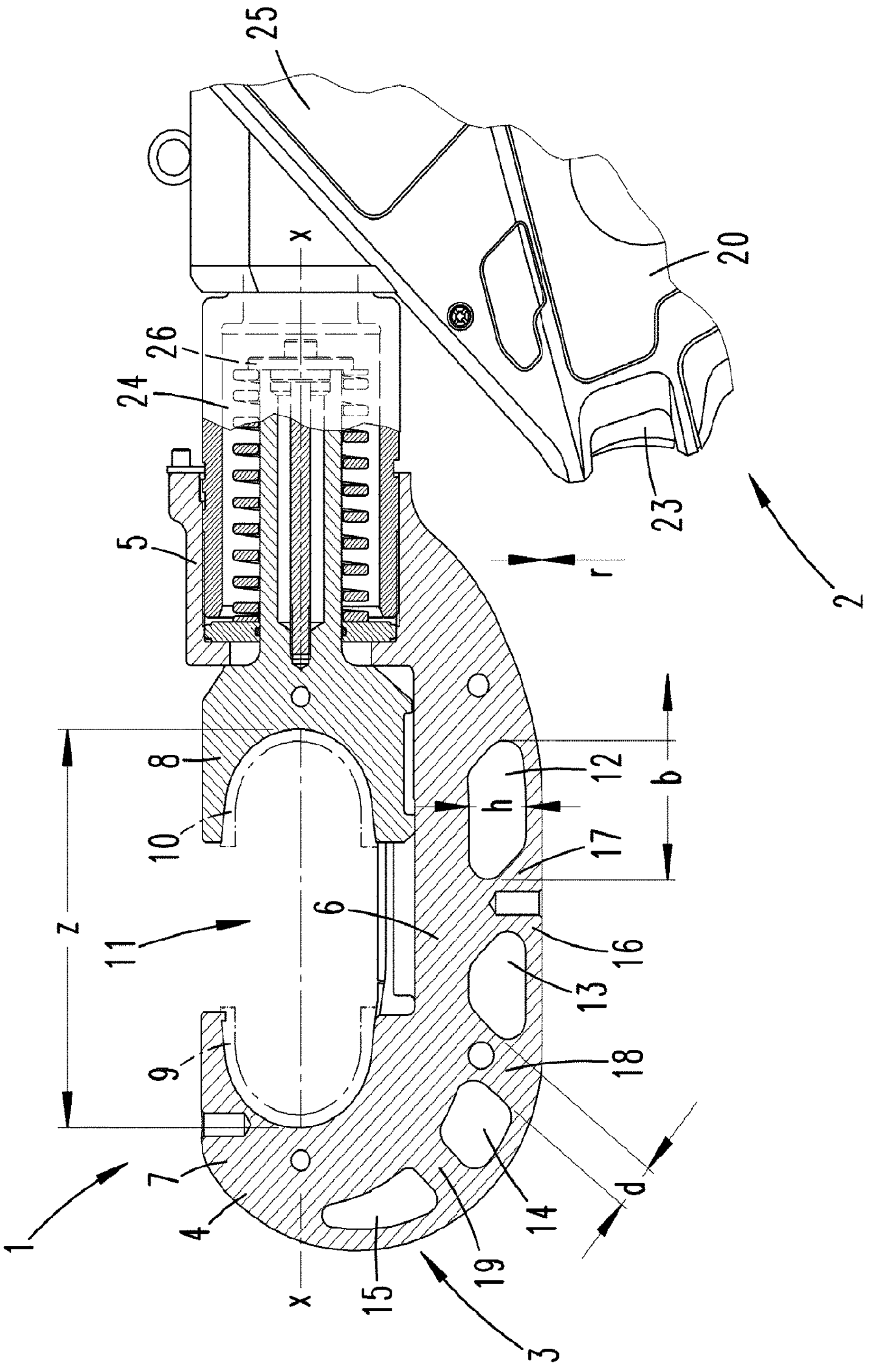
FIG. 7 is a longitudinal section of the tool head.
Figure 8:
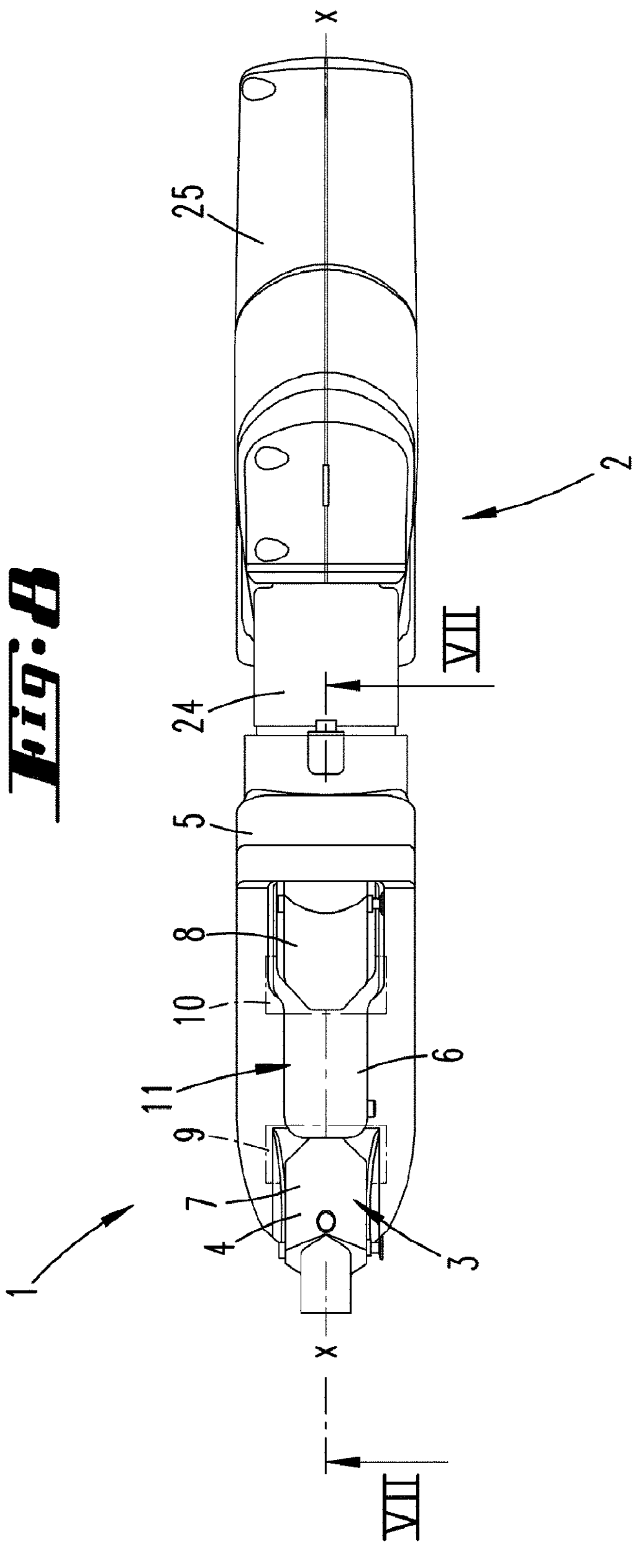
FIG. 8 is a top view of the tool according to FIG. 2.

FIG. 1 initially shows a tool 2 with a rod-shaped hull tool base 20, wherein an accumulator 22 for supplying power to the tool 2 is arranged on its free end piece 21. For example, the tool 2 is here a hydraulically actuatable crimping tool 2. Alternatively, however, the tool 2 can also be modified to serve other purposes, for example cutting or punching workpieces. The hull tool base 20 further has a handle 23, with which the user can guide the tool 2. In addition to the handle 23 of the hull tool base 20, the tool 2 can also have yet another handle part not shown here, for example, so as to be able to safely guide and hold especially heavy tools 2, in particular when onehanded operation is not possible for reasons of weight. In particular, the invention also provides for tools 2 that have a separately provided unit, in particular a separate power supply device, a separately provided hydraulic power unit, which is connected by a hydraulic hose with a tool head 1 of the tool 2, or the like. In the embodiment provided according to the figures shown here, the tool head 1 of the tool 2 is connected via an adapter 24 with a hydraulic power unit, which is integrated into a hull tool body 25 of the tool 2.

The tool head 1 of the tool 2 has a head body 3 with an integral, one-piece design. The head body 3 can have roughly a C-shaped design as viewed from the side on FIG. 2 or FIG. 3, where a longitudinal axis x of the tool 2 or tool head 1 is depicted as a line. The head body 3 here has a first C-leg 4 and a second C-leg 5, which are connected by a connecting web 6 formed essentially parallel to the longitudinal axis x. The two C-legs 4, 5 as well as the connecting web 6 span a device jaw 11, into which a workpiece to be machined by the tool 2 can be introduced. The first C-leg 4 has a first tool carrier 7. The second C-leg 5 has a second tool carrier 8. The first tool carrier 7 here is integrally designed as one piece with the first C-leg 4, while the second tool carrier 8 can be displaced into the device jaw 11 relative to the first tool carrier 7. For example, the second tool carrier 8 can here be hydraulically displaced by a hydraulic piston 26 linearly shifted in the hull tool body 25.

Each of the two tool carriers 7, 8 is used for preferably detachably receiving a tool part 9, 10, wherein the first tool carrier 7 carries a first tool part 9, and wherein the second tool carrier 8 carries a second tool part 10. In order to detachably fasten the tool part 9, 10 to the assigned tool carrier 7, 8, the tool part 9, 10 and tool carrier 7, 8 have corresponding holding means 27, 28. The respective tool part 9, 10 can be latched with the corresponding tool carrier 7, 8, for example. In addition, in particular the second tool carrier 8 linearly slidably mounted in the hull tool body 25 can be removed from the head body 3 of the tool head 1 via the device jaw 11.

The tool head 1 has a plurality of through openings 12, 13, 14, 15 on the connecting leg 6, which are separated from each other by material bracings 17, 18, 19. An opening plane of the through openings 12, 13, 14, 15 lies parallel to a plane in which the head body 3 is C-shaped, as discernible on FIGS. 2 and 3, for example. Apart from the through openings 12, 13, 14, 15, a narrow edge area 16 remains on the outside of the connecting web 6, which ensures the stability of the tool head 1. As discernible in more detail on FIG. 3, the edge area 16 has an edge height r, which corresponds to roughly 25 percent of an opening height h of the through opening 12, 13, 14, 15. The material bracings 17, 18, 19 present between the through openings 12, 13, 14, 15 have a lightly tailored shape, wherein the respective material bracing 17, 18, 19 extends from the device jaw 11 up to the edge area 16 of the connecting web 6. A central bracing width d in the area of the narrowest point of the tailored progression of the material bracing 17, 18, 19 here measures roughly 20 percent of an opening width b of an adjacent through opening 12, 13, 14, 15. Of the total of four through openings 12, 13, 14, 15, through opening 13 is obviously especially large, and has an opening width b and opening height h that is clearly larger than the opening widths b and opening heights h of the remaining through openings 12, 14, 15. In relation to a direction parallel to the longitudinal axis x, through opening 13 extends nearly along an entire width z of the device jaw 11. As a result, cracks 11 emanating from the device jaw 11, for example which are caused by the tool head 1 having reached the end of its service life, can be intercepted with great certainty by the through opening 13, and thus do not get to the edge area 16 of the connecting web 6. Depending on the geometry of the head body 3, the material bracings 17, 18, 19 are here arranged in such a way that cracks arising at the edge of the device jaw 11 usually do not run to a material bracing 17, 18, 19, but rather to a through opening 12, 13, 14, 15. As a consequence, the size of the through openings 12, 13, 14, 15 with their specific opening width b and opening height h saves on the weight of the tool head 1 on the one hand, and on the other hand interrupts crack growth as soon as a crack arrives in a through opening 12, 13, 14, 15. In conjunction with an inventive manufacture of the tool head 1 via metal casting, even breaks or cracks resulting from any casting defects, for example shrink holes, thus become uncritical. For example, the tool head 1 is here manufactured out of steel or titanium within the framework of an investment casting process.

The through openings 12, 13, 14, 15 follow the overall arched shape of the connecting web 6, and are thus not formed on a line parallel to the longitudinal axis x of the tool head. As a result, a distance between a through opening 12, 13, 14, 15 and the device jaw 11 can essentially be retained, so that the probability of an unwanted crack propagation along the circumference of the device jaw 11 is essentially as low.

FIGS. 5 to 8 show an alternative design of a tool head 1 according to the invention. This tool head 1 likewise has four through openings 12, 13, 14, 15, but they are smaller in design as compared with the through openings 12, 13, 14, 15 according to FIGS. 1 to 4, and have opening widths b and opening heights h that are similar to each other. As a result, the tool head 1 becomes more stable as a whole, and can absorb greater loads by comparison with the tool head 1 in the first embodiment. In addition, the material bracings 17, 18, 19, as evident in particular on FIGS. 6 and 7, have a bracing width d that remains essentially the same along its longitudinal extension. Otherwise, the through openings 12, 13, 14, 15 according to the exemplary embodiment on FIGS. 5 to 8 also follow an arched shape along the circumference of the essentially C-shaped head body 3.

The above statements serve to explain the inventions covered by the application as a whole, which each also independently advance the prior art at least by the following feature combinations, wherein two, several or all of these feature combinations can also be combined, specifically:

A tool head 1 for a tool 2, characterized in that the head body 3 of the tool head 1 is manufactured in a metal casting process.

A tool head 1 for a tool 2, characterized in that the head body 3 is manufactured out of steel or titanium.

A tool head 1 for a tool 2, characterized in that an edge area 16 of the connecting web 6 spaced apart from the device jaw 11 by the through openings 12, 13, 14, 15 has an edge height r transverse to the longitudinal axis x that measures 20 percent to 40 percent of an opening height h of a through opening 12, 13, 14, 15.

A tool head 1 for a tool 2, characterized in that the connecting web 6 has three to five, in particular four, through openings 12, 13, 14, 15, which, as viewed from the side transverse to the longitudinal axis x of the tool head 1, are arranged arched one next to the other from the first C-leg 4 up to the second C-leg 5.

A tool head 1 for a tool 2, characterized in that the through opening 12, 13, 14, 15 expands proceeding from the device jaw 11 of the head body 3 up to an edge area 16 of the connecting web 6 facing away from the device jaw 11 of the head body 3.

A tool head 1 for a tool 2, characterized in that the material bracing 17, 18, 19 has a bracing width d as viewed transverse to the opening plane of the through opening 12, 13, 14, 15 that corresponds to approx. 10 percent to 50 percent of an opening width b of the through opening 12, 13, 14, 15.

A tool head 1 for a tool 2, characterized in that the material bracing 17, 18, 19 has an essentially constant bracing width d proceeding from the device jaw 11 of the head body 3 up to an edge area 16 of the connecting web 6 facing away from the device jaw 11 of the head body 3.

A tool head 1 for a tool 2, characterized in that the material bracing 17, 18, 19 is essentially waist-shaped as viewed transverse to the opening plane of the through opening 12, 13, 14, 15, wherein the material bracing 17, 18, 19 initially tapers proceeding from the device jaw 11 of the head body 3 up to an edge area 16 of the connecting web 6 facing away from the device jaw 11 of the head body 3, and then expands again.

A tool head 1 for a tool 2, characterized in that a through opening 12, 13, 14, 15 has an opening width b relative to a direction parallel to the longitudinal axis x of the tool head 1 corresponding to approx. 50 percent to 100 percent of a width z of the device jaw 11 of the head body 3.

A method for manufacturing a tool head, characterized in that the head body 3 of the tool head 1 is manufactured via metal casting, in particular the investment casting of steel or titanium.

All disclosed features (whether taken separately or in combination with each other) are essential to the invention. The disclosure of the application hereby also incorporates the content disclosure of the accompanying/attached priority documents (copy of the prior application) in its entirety, also for the purpose of including features of these documents in claims of the present application. Even without the features of a referenced claim, the subclaims characterize standalone inventive further developments of prior art with their features, in particular so as to submit partial applications based upon these claims. The invention indicated in each claim can additionally have one or several of the features indicated in the above description, in particular those provided with reference numbers and/or indicated on the reference list. The invention also relates to design forms in which h individual features specified in the above description are not realized, in particular if they are recognizably superfluous with regard to the respective intended use, or can be replaced by other technically equivalent means.

Reference List

| | |
|---|---|
| 1 | Tool head |
| 2 | Tool |
| 3 | Head body |
| 4 | C-leg |
| 5 | C-leg |
| 6 | Connecting web |
| 7 | Tool carrier |
| 8 | Tool carrier |
| 9 | Tool part |
| 10 | Tool part |
| 11 | Device jaw |
| 12 | Through opening |
| 13 | Through opening |
| 14 | Through opening |
| 15 | Through opening |
| 16 | Edge area |
| 17 | Material bracing |
| 18 | Material bracing |
| 19 | Material bracing |
| 20 | Hull tool base |
| 21 | End piece |
| 22 | Accumulator |
| 23 | Handle |
| 24 | Adapter |
| 25 | Hull tool body |
| 26 | Hydraulic piston |
| 27 | Holding means |
| 28 | Holding means |
| b | Opening width |
| d | Bracing width |
| h | Opening height |
| r | Edge height |
| x | Longitudinal axis |
| z | Width |

The invention claimed is:

1. A tool head for a hydraulically actuatable tool comprising:

a metal generally C-shaped head body having a front end, a rear end and first and second opposite sides, the C-shaped head body defining a longitudinal axis, the C-shaped head body having first and second legs and a connecting web connecting the legs which form a device jaw;

the first and second legs lying opposite each other along the longitudinal axis, the first leg having a first tool carrier which is configured to receive a first tool part, and the second leg having a second tool carrier which is configured to receive a second tool part, wherein the second tool carrier is displaceable relative to the first tool carrier along the longitudinal axis, wherein the second tool carrier can be displaced from a first starting position remote from the first tool carrier and into a final working position adjacent to the first tool carrier; and the connecting web being offset from the longitudinal axis, the connecting web having multiple through openings extending between the opposite sides and lying one behind the other and are separated by material bracing, and wherein the through openings follow an arched shape of the connecting web, such that a first imaginary line is defined which passes through each through opening, and wherein a second imaginary line which is parallel to the longitudinal axis and passes through each through opening cannot be defined.

2. The tool head according to claim 1, wherein an edge area of the connecting web spaced apart from the device jaw by the through openings has an edge height transverse to the longitudinal axis that measures 20 percent to 40 percent of an opening height of each of the through openings.

3. The tool head according to claim 1, wherein the connecting web has three to five through openings which, as viewed from the side transverse to the longitudinal axis of the tool head, are arranged arched one next to the other from the first leg up to the second leg.

4. The tool head according to claim 1, wherein the through openings expand proceeding from the device jaw up to an edge area of the connecting web facing away from the device jaw.

5. The tool head according to claim 1, wherein the material bracing has a bracing width as viewed transverse to an opening plane of each through opening that corresponds to 10 percent to 50 percent of an opening width of each through opening.

6. The tool head according to claim 1, wherein the material bracing has an essentially constant bracing width proceeding from the device jaw up to an edge area of the connecting web facing away from the device jaw.

7. The tool head according to claim 1, wherein the material bracing is waist-shaped as viewed transverse to an opening plane of each through opening, wherein the material bracing initially tapers proceeding from the device jaw up to an edge area of the connecting web facing away from the device jaw, and then expands again.

8. The tool head according to claim 1, wherein each through opening has an opening width relative to a direction parallel to the longitudinal axis of the tool head corresponding to 50 percent to 100 percent of a width of the device jaw.

9. A tool head for a hydraulically actuatable tool according to claim 1, further comprising:

a metal generally C-shaped head body having a front end, a rear end and first and second opposite sides, the C-shaped head body defining a longitudinal axis, the C-shaped head body having first and second legs and a connecting web connecting the legs which form a device jaw;

the first and second legs lying opposite each other along the longitudinal axis, the first leg having a first tool carrier which is configured to receive a first tool part, and the second leg having a second tool carrier which is configured to receive a second tool part, wherein the second tool carrier is displaceable relative to the first tool carrier along the longitudinal axis, wherein the second tool carrier can be displaced from a first starting position remote from the first tool carrier and into a final working position adjacent to the first tool carrier;

the connecting web being offset from the longitudinal axis, the connecting web having multiple through openings extending between the opposite sides and lying one behind the other and which are separated by material bracing; and wherein the through openings follow an arched shape of the connecting web and wherein an imaginary line is defined which extends parallel to the longitudinal axis, extends through one of the through openings and extends through the device jaw.

10. The tool head according to claim 9, wherein an edge area of the connecting web spaced apart from the device jaw by the through openings has an edge height transverse to the longitudinal axis that measures 20 percent to 40 percent of an opening height of each of the through openings.

11. The tool head according to claim 9, wherein the connecting web has three to five through openings which, as viewed from the side transverse to the longitudinal axis of the tool head, are arranged arched one next to the other from the first leg up to the second leg.

12. The tool head according to claim 9, wherein the through openings expand proceeding from the device jaw up to an edge area of the connecting web facing away from the device jaw.

13. The tool head according to claim 9, wherein the material bracing has a bracing width as viewed transverse to an opening plane of each through opening that corresponds to 10 percent to 50 percent of an opening width of each through opening.

14. The tool head according to claim 9, wherein the material bracing has an essentially constant bracing width proceeding from the device jaw up to an edge area of the connecting web facing away from the device jaw.

15. The tool head according to claim 9, wherein the material bracing is waist-shaped as viewed transverse to an opening plane of each through opening, wherein the material bracing initially tapers proceeding from the device jaw up to an edge area of the connecting web facing away from the device jaw, and then expands again.

16. The tool head according to claim 9, wherein each through opening has an opening width relative to a direction parallel to the longitudinal axis of the tool head corresponding to 50 percent to 100 percent of a width of the device jaw.

17. A tool head for a hydraulically actuatable tool comprising:

a metal generally C-shaped head body having a front end, a rear end and first and second opposite sides, the C-shaped head body defining a longitudinal axis, the C-shaped head body having first and second legs and a connecting web connecting the legs which form a device jaw;

the first and second legs lying opposite each other along the longitudinal axis, the first leg having a first tool carrier which is configured to receive a first tool part, and the second leg having a second tool carrier which is configured to receive a second tool part, wherein the second tool carrier displaceable relative to the first tool carrier along the longitudinal axis, wherein the second tool carrier can be displaced from a first starting position remote from the first tool carrier and into a final working position adjacent to the first tool carrier; and the connecting web having multiple through openings extending between the opposite sides and lying one behind the other and are separated by material bracing, and wherein one of the through openings is positioned above the other through openings in a direction transverse to the longitudinal axis.

18. The tool head according to claim 17, wherein the through openings follow an arched shape of the connecting web, such that a first imaginary line is defined which passes through each through opening, and wherein a second imaginary line which is parallel to the longitudinal axis and passes through each through opening cannot be defined.

19. The tool head according to claim 18, wherein an edge area of the connecting web spaced apart from the device jaw by the through openings has an edge height transverse to the longitudinal axis that measures 20 percent to 40 percent of an opening height of each of the through openings.

20. The tool head according to claim 18, wherein the connecting web has three to five through openings which, as viewed from the side transverse to the longitudinal axis of the tool head, are arranged arched one next to the other from the first leg up to the second leg.

21. The tool head according to claim 18, wherein the through openings expand proceeding from the device jaw up to an edge area of the connecting web facing away from the device jaw.

22. The tool head according to claim 18, wherein the material bracing has a bracing width as viewed transverse to an opening plane of each through opening that corresponds to 10 percent to 50 percent of an opening width of each through opening.

* * * * *